(No Model.)
W. H. THOMAS.
BICYCLE SEAT.
No. 606,314. Patented June 28, 1898.
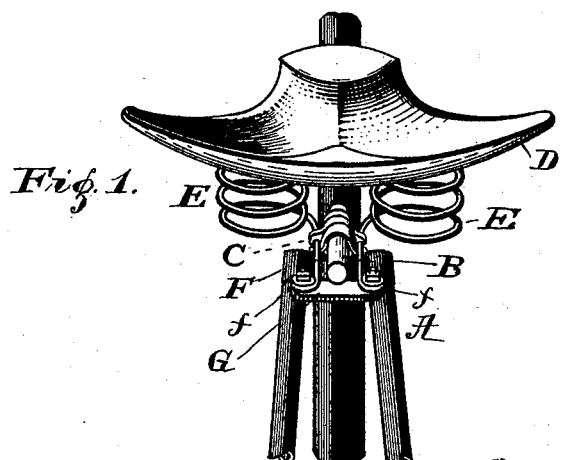
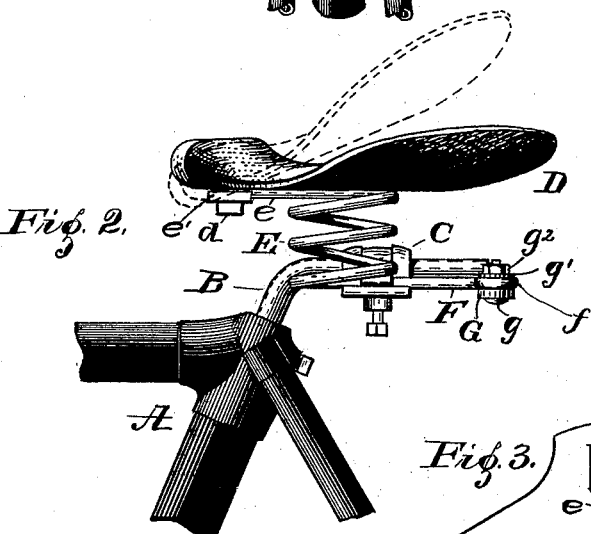
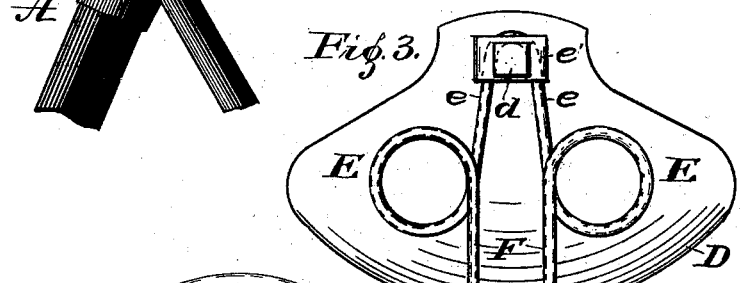
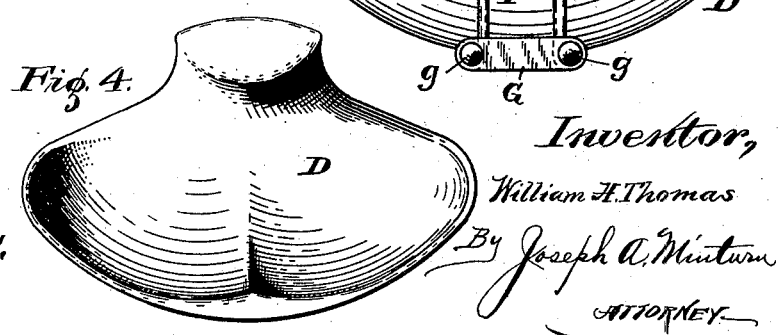
Witnesses;
David C. Bryan
E. C. Thomas.
Inventor,
William H. Thomas
By Joseph A. Minturn
ATTORNEY
THE NORRIS PETERS CO., PHOTO-LITHO., WASHINGTON, D. C.

UNITED STATES PATENT OFFICE.

WILLIAM H. THOMAS, OF INDIANAPOLIS, INDIANA.

BICYCLE-SEAT.

SPECIFICATION forming part of Letters Patent No. 606,314, dated June 28, 1898.

Application filed October 22, 1896. Serial No. 609,661. (No model.)

*To all whom it may concern:*

Be it known that I, WILLIAM H. THOMAS, a citizen of the United States, residing at Indianapolis, in the county of Marion and State of Indiana, have invented certain new and useful Improvements in Bicycle-Seats; and I do hereby declare the following to be a full, clear, and exact description of the invention, such as will enable others skilled in the art to which it appertains to make and use the same.

The object of this invention is to provide a seat for bicycles which will support the rider with less fatigue than with the saddles now in common use and which will sustain the weight of the rider with less injurious effects to said rider and at the same time allow of greater freedom of movement and resiliency of the seat in all directions than has heretofore been possible.

I accomplish the objects of the invention by means of the mechanism illustrated in the accompanying drawings, in which—

Figure 1 is a rear view in perspective of my improved seat; Fig. 2, a side elevation of same, showing a portion of the bicycle-frame; Fig. 3, an under side view of the seat removed from the bicycle, and Fig. 4 a top or plan view of the seat removed from the bicycle.

Similar letters of reference indicate like parts throughout the several views of the drawings.

A represents a portion of the frame of a bicycle, B the saddle-post, and C the saddle-clip, all of well-known and usual construction.

D is the seat, which will preferably be made of wood, although other materials might be used. It is hollowed out on top and shaped to fit the natural contour of that part of the human body with which it comes in contact when the rider is sitting thereon. The middle line of the seat is raised to form a ridge, but the ridge is not sufficiently prominent to cause the weight of the rider to be supported by resting on said ridge. The seat rests on and is attached at a single point to arms $e$ from the two coiled springs E by means of the screw or bolt $d$. The arms $e$ are the upper extensions from the two coils E and will preferably be made from a single continuous rod or heavy wire bent into a loop, as shown, and the bolt or screw $d$ fits close in the bend. A clamping-plate $e'$ is between the arms and the head of the bolt or screw. This plate has its ends bent up at right angles, and the bent ends are placed outside of the arms to act as a clamp and hold them from spreading away from the bolt. This continuous construction of the arms $e$ is preferable; but it is apparent that the arms might be made in separate pieces—that is, detached at the ends instead of being continuous—without departing from the spirit of this invention. The lower ends of the coils are projected backwardly to form the arms F and terminate with the horizontal eyes $f$. G is a flat bar, which is bolted to the arms F, so as to join the arms together. Bolts $g$ are used for fastening the bar to the arms by passing the bolts through holes in the ends of the bar and then through the eyes in the ends of the arms. A washer $g'$ is placed on top of the eyes, and the nuts $g^2$ are then screwed down, thereby clamping the horizontal eyes between the washer and the bar in a manner that will keep the arms from rotating and will develop the torsional elasticity of the arms.

H is a clamp of usual construction for fastening the seat to the saddle-post, and it will not be necessary to enter into a detailed description of its construction. It grasps and holds both arms F.

The coils E, with their forward extensions above and rearward extensions below, form the frame on which the seat is made to rest. By this construction the seat is free to tip forward, as shown in dotted lines in Fig. 2, backward in an oppositely-inclined angle, to the right, or to the left—in fact, the seat has a universal adjustment, and in all such positions the elasticity of the coiled springs remains unimpaired. The shape of the seat itself, taken in connection with its spring-support, prevents injury to the rider in any or all of those parts which lie in the middle line between the hips, the weight being supported on the tuberosities of the ischii, or the lower part of the hip-bones, and the soft parts which are attached thereto.

By attaching the seat at a single point a rocking or vibratory motion is given to the rider when the bicycle passes over any uneven surface. This rocking motion, in connection with the elasticity of the springs, very materially lessens the jar occasioned by riding over rough surfaces, thereby contributing to the comfort and health of the rider.

Having thus fully described my invention, what I claim as new, and wish to secure by Letters Patent of the United States, is—

The combination with a rigid bicycle-seat and the saddle-post of a bicycle, of a spring-frame secured to the seat at a single point, said frame comprising two oppositely-coiled springs, forward horizontal projections from the top of each coil and similar rearward projections from the bottom of said coils, said bottom projections being united and secured to the saddle-post whereby the torsional elasticity of said arms will be developed, all substantially as described and for the purposes specified.

In testimony whereof I affix my signature in presence of two witnesses.

WM. H. THOMAS.

Witnesses:
   JOSEPH A. MINTURN,
   DAVID C. BRYAN.